June 25, 1963   D. LEWIS   3,094,996
DENTAL FLOSS HOLDER AND APPLICATOR
Filed Oct. 25, 1961
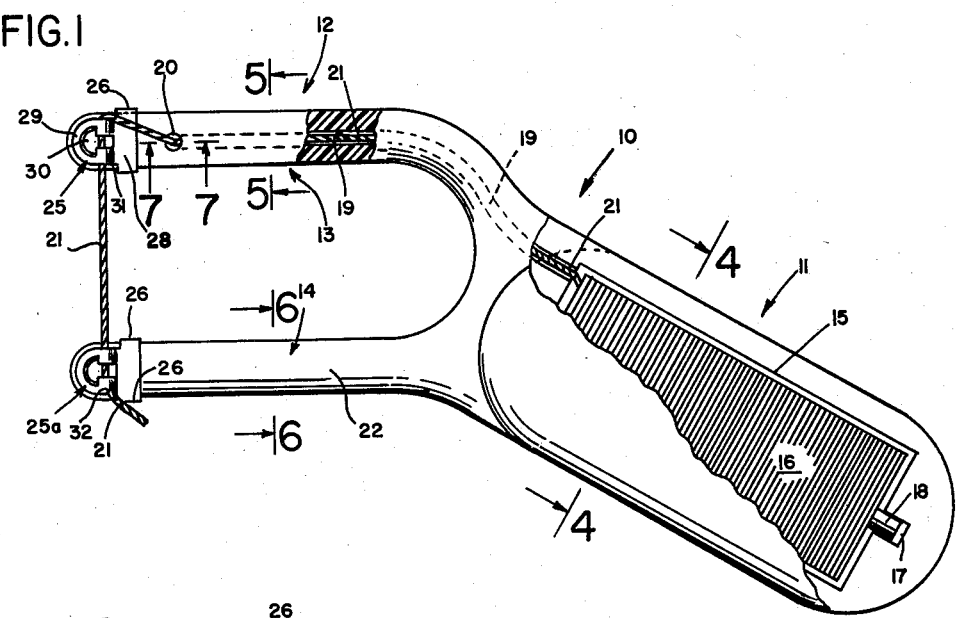
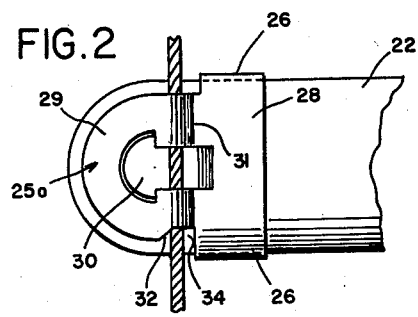
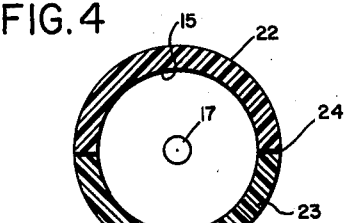
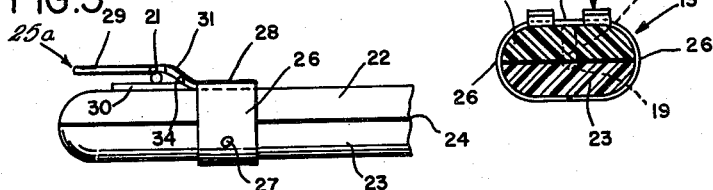
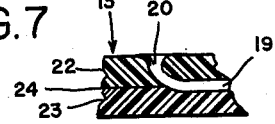
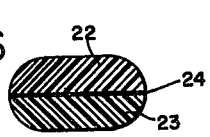
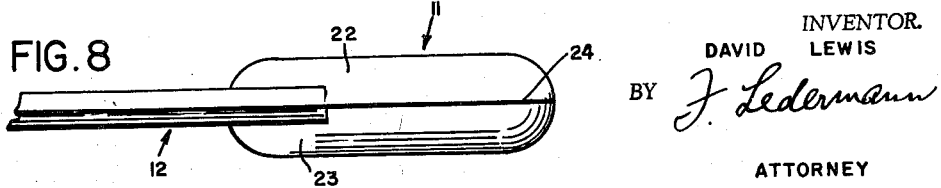
INVENTOR.
DAVID LEWIS
BY J. Ledermann
ATTORNEY

United States Patent Office 3,094,996
Patented June 25, 1963

3,094,996
DENTAL FLOSS HOLDER AND APPLICATOR
David Lewis, 187 Newark Ave., Jersey City, N.J.
Filed Oct. 25, 1961, Ser. No. 147,636
3 Claims. (Cl. 132—92)

This invention relates to dental floss holders and applicators, and an object of the invention is the provision of a novel and improved device whereby dental floss may be used to loosen food particles wedged between the teeth without having to insert a finger or fingers into the mouth, as is necessary with the common form of dental floss holder now on the market. Inserting fingers into the mouth to hold one end of the floss is not only a clumsy procedure but it is also obviously unsanitary.

Another object of the invention is the provision of a combination dental floss holder and applicator of novel and practical construction including a hollow handle portion adapted to contain a spool of floss and, integral therewith, and extending at an acute angle thereto, a yoke on the ends of the arms of which suitable clips are mounted to retain the floss against being pulled therethrough while using the device, one of the clips being further provided with cutter means to sever the thread after use so that a fresh length of thread may be positioned for use.

A further object of the invention is the provision of a combination device as set forth above, which is simple in construction and inexpensive in cost of manufacture while at the same time being easily used or operated.

The above as well as additional objects will be clarified in the following description wherein reference numerals refer to like-numbered parts. It is to be noted that the drawing is intended primarily for the purpose of illustration and that it is therefore neither desired nor intended to limit the invention necessarily to any or all of the exact details shown or described except insofar as they may be deemed essential to the invention.

Referring briefly to the drawing, FIG. 1 is a plan view of a combination dental floss holder and applicator embodying features of the present invention, with parts broken away and partly in section.

FIG. 2 is an enlarged plan view of the extremity of the lower yoke arm of FIG. 1.

FIG. 3 is an enlarged side elevational view of the lower yoke arm of FIG. 1.

FIG. 4 is a sectional view taken on the line 4—4 of FIG. 1.

FIG. 5 is a sectional view taken on the line 5—5 of FIG. 1.

FIG. 6 is a sectional view taken on the line 6—6 of FIG. 1.

FIG. 7 is a sectional view taken on the line 7—7 of FIG. 1.

FIG. 8 is a fragmentary side elevational view of the device as seen looking upward at FIG. 1.

Referring in detail to the drawing, the numeral 10 indicates the combination dental floss holder and applicator of the present invention, as a whole. The device 10 consists of a body 11 having two substantially parallel yoke arms 13 and 14, together constituting the yoke 12, extending therefrom at an acute angle thereto.

The body 11 which also constitutes the handle of the device, is hollow inside to provide a cylindrical chamber 15 adapted to receive a spool 16 of dental floss. To facilitate rotation of the spool while thread is being drawn therefrom, the end of the compartment remote from the yoke 11 may be provided with an axial recess or bore 17 receptive of a spindle 18 on the corresponding end of the spool 16.

A passage 19 is provided partway through the arm 13 from the chamber 15, this passage terminating near but spaced from the outer tip of the arm. A second passage 20 extends upward from and communicates with the passage 19 at its outer end, the passage 20 extending through the upper half of the arm 13. The junction of the passages 19, 20 may be rounded as shown in FIG. 7. It is thus obvious that thread 21 from the spool 16 may be fed through the passages 19 and 20 and out through the latter.

The entire device 10 is preferably made of two complementary half-sections 22 and 23 of, preferably, synthetic plastic material which may be transparent, translucent or otherwise, suitably molded to provide the chamber 15 and the passages 19 and 20. The two sections are cemented or otherwise secured together along the line 24. Prior to cementing the sections together, a length of thread 21 will be drawn off the spool and passed through the passage 19, 20 to extend a sufficient distance from the arm 13. The top and bottom surfaces of the yoke arms are preferably flat and mutually parallel, substantially as shown.

On the extremity of the arm 13, on the top surface thereof, a thread clamping member 25 is provided, which may be stamped out of a sheet of metal, two strips 26 of which are bent around the arm 13 to secure the member to the arm in a tight friction fit, but if desired and believed advisable additional securing means may be provided, as, for example, pins, of which but one is shown at 27 in FIG. 3, may be passed through the strips or bands 26 into the yoke arms.

The member 25 comprises a base portion 28 from which the strips 26 extend, and a body portion 29 extending forward from the base 28. A substantially T-shaped tongue 30 is stamped out of the body 29, and the body is deformed or raised above the tongue 30 so that the body together with the base 28 and the connecting portion 31 are Z-shaped as shown in FIG. 3. Owing to the springiness of the material of which the member 25 is formed, it is apparent that when the thread 21 is passed between the body and the tongue and urged downward between them, the thread will be firmly clamped.

The clamping member 25a shown secured to the extremity of the arm 14 on the top surface thereof, is identical to the member 25 except for one particular. It will be noted that the member 25a differs from the member 25 only in that it has an indent or cut-out 32 in the portion 31 thereof on the side thereof remote from the arm 13, which provides a straight edge 34. Since the two members 25 and 25a are identical except for the cut-out 32 and the straight or cutting edge, only the member 25a has been shown in detail in FIGS. 2 and 3, and the same reference numerals except for the numerals 32 and 34 identify like structure in both members 25 and 25a.

With the device assembled as shown in FIG. 1, that is, with the thread 21 passed between the tongue 30 and the body 29 and drawn tautly across the two yoke arms and again clamped between the tongue and body of the member 25a, the device is ready for use. The end of one yoke arm is inserted into the mouth so that the length of thread between the yoke arms may be brought down or up between adjacent teeth to remove or loosen food particles settled between the teeth.

After use of the device, the thread is loosened from both members 25 and 25a and a sufficient length is drawn from the spool to permit of passing a fresh length across the yoke arms and securing the thread tautly between the members 25 and 25a, and finally the length of previously used thread is cut off by drawing the thread against the cutting edge 34, all in an obvious manner.

What is claimed and desired to be secured by Letters Patent is as follows:

1. A dental floss holder and applicator comprising a unitary body including an elongated hollow handle portion having a substantially cylindrical chamber therein containing a spool of thread rotatably mounted therein and a yoke integral with and extending from one end of the handle portion and lying in the plane of the axis of said chamber at an acute angle to the axis, the yoke comprising a first arm and a second arm, said arms having top surfaces lying in a common plane, each of said arms having a spring clip secured on the outer end thereof on said top surfaces thereof, said first yoke arm having a passage extending thereinto through the top surface thereof at a position near but spaced from the spring clip thereon and having a second passage therein extending longitudinally of the arm between the adjacent end of said chamber and said first-named passage, the thread from the spool passing through said passages, the spring clips being formed of resilient material and including a base portion and two spaced members extending from the base portion at an acute angle to each other, means for securing the base portions of the spring clips to the yoke arms, the portion of the thread which extends from the first-named passage to the outside of said first yoke arm being adapted to be frictionally secured between said members on the first yoke arm and bridged across the yoke arms and frictionally secured between said members on the second yoke arm, the spring clip on the second yoke arm having additionally a cutter thereon for severing the thread after the device has been used.

2. A dental floss holder according to claim 1, said means comprising extensions from opposite ends of said base portion passed around and clamped against the yoke arm.

3. A dental floss holder according to claim 1, the cutter on the spring clip on said second yoke arm being positioned on that side of the spring clip remote from the spring clip on the first yoke arm.

References Cited in the file of this patent

UNITED STATES PATENTS

| | | |
|---|---|---|
| 1,210,207 | Roach | Dec. 26, 1916 |
| 1,607,061 | Deming | Nov. 16, 1926 |
| 2,052,520 | Sonnenberg | Aug. 25, 1936 |
| 2,599,303 | Ward | June 3, 1952 |